(12) United States Patent
Bedinger et al.

(10) Patent No.: US 9,112,275 B2
(45) Date of Patent: Aug. 18, 2015

(54) RADOME FILM

(75) Inventors: John Bedinger, Garland, TX (US); Michael A. Moore, Fort Worth, TX (US); Waid A. Paine, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 416 days.

(21) Appl. No.: 13/604,204

(22) Filed: Sep. 5, 2012

(65) Prior Publication Data

US 2015/0207218 A1    Jul. 23, 2015

(51) Int. Cl.
| | | |
|---|---|---|
| *B32B 15/01* | (2006.01) | |
| *B05D 5/12* | (2006.01) | |
| *H01Q 1/42* | (2006.01) | |
| *C04B 35/14* | (2006.01) | |

(52) U.S. Cl.
CPC *H01Q 1/42* (2013.01); *C04B 35/14* (2013.01); *C04B 2235/6027* (2013.01); *C04B 2235/72* (2013.01)

(58) Field of Classification Search
USPC .......................................................... 438/396
See application file for complete search history.

(56) References Cited

U.S. PATENT DOCUMENTS

| | | |
|---|---|---|
| 5,979,826 A | 11/1999 | Brown et al. |
| 6,037,023 A | 3/2000 | Purinton et al. |
| 6,080,455 A | 6/2000 | Purinton et al. |
| 7,681,834 B2 | 3/2010 | Facciano et al. |
| 7,710,347 B2 | 5/2010 | Gentilman et al. |
| 8,722,160 B2 | 5/2014 | Sager et al. |
| 2009/0152135 A1 | 6/2009 | Mason et al. |
| 2009/0291200 A1 | 11/2009 | Bedinger et al. |
| 2012/0070691 A1 | 3/2012 | Graf |
| 2012/0098169 A1 | 4/2012 | Kumar et al. |

OTHER PUBLICATIONS

Extended European Search Report issued in EP application No. 13174942.6 on May 30, 2014, 9 pgs.

*Primary Examiner* — Asok K Sarkar
(74) *Attorney, Agent, or Firm* — Cantor Colburn LLP

(57) ABSTRACT

A radome is provided and includes a substrate formed of moisture permeable material and a coating disposed on a surface of the SCFS substrate. The coating includes a layer of inorganic material disposed adjacent to at least one layer of organic material.

20 Claims, 3 Drawing Sheets

RADOME FILM

The subject matter for this application was developed in part under government (DOD) contract number 10C1700 (title withheld). The government has certain rights to this invention.

BACKGROUND

The present disclosure relates generally to radome films and, more particularly, to low permeable materials for radome films.

A radome is an enclosure that protects a device, such as a microwave or radar antenna. The radome is constructed of material that minimally attenuates electromagnetic signals. Radomes also serve to protect antenna surfaces from weather or to conceal antenna electronic equipment from view. Radomes can be spherical, geodesic, planar, etc., depending upon the particular application and may be ground or aircraft based.

Slip cast fused silica (SCFS) is a porous material that is commonly used in radomes that are required to have low loss characteristics with respect to various types of microwave energy, to withstand broad temperature excursions and to survive extreme physical stress. The migration of electronics to non-hermetic packaging, which is housed within the radome, has thus exposed certain sensitive devices to environments to which the radome likewise is exposed. Of particular concern is exposure of the electronics to moisture where the porosity of the fused silica allows both liquid and vapor to pass through. The low coefficient of thermal expansion (CTE) of the fused silica also presents challenges to attempts to infiltrate or coat radome systems to thereby reduce liquid or vapor transmission.

Indeed, previous attempts to address the problems of SCFS have involved remelting the surface of the SCFS to form a continuous "glass" layer. This process tended to ultimately compromise structural requirements of the assembly or resulted in cracks that allowed rapid influx of water vapor. Vacuum infiltration of SCFS with a liquid silicone material has also been attempted. Here, the silicone material prevents liquids from passing through the radome wall but does not limit its water vapor transmission rate (WVTR). Desiccants have also been used inside the radome to lower moisture levels but this is an "after-the-fact" solution that does not prevent moisture infiltration.

SUMMARY

According to one embodiment, a radome is provided and includes a substrate formed of moisture permeable material and a coating disposed on a surface of the SCFS substrate. The coating includes a layer of inorganic material disposed adjacent to at least one layer of organic material.

According to another embodiment, a radome is provided and includes a slip cast fused silica (SCFS) substrate, a first nano-laminate layer including organic material disposed on a surface of the SCFS substrate, a second nano-laminate layer including inorganic material disposed on a surface of the first nano-laminate layer and a third nano-laminate layer including organic material disposed on a surface of the second nano-laminate layer.

According to yet another embodiment, a method of forming a radome including a slip cast fused silica (SCFS) substrate is provided. The method includes forming a first nano-laminate layer including organic material on a surface of the SCFS substrate, forming a second nano-laminate layer including inorganic material on a surface of the first nano-laminate layer and forming a third nano-laminate layer including organic material disposed on a surface of the second nano-laminate layer.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A radome film is provided that has been developed to significantly reduce moisture levels within a cavity enclosed by the radome.

Figure 1:
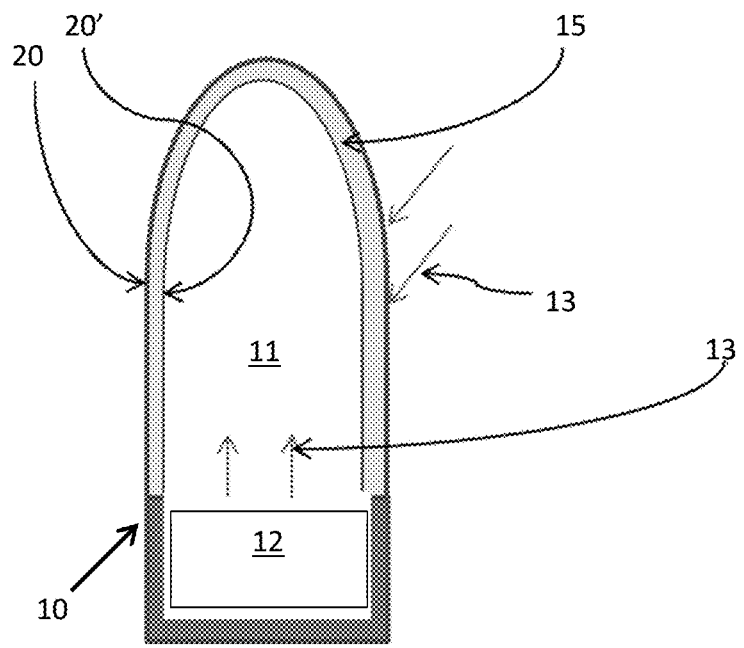
FIG. 1 is a schematic side view of a radome in accordance with embodiments.
Figure 2:
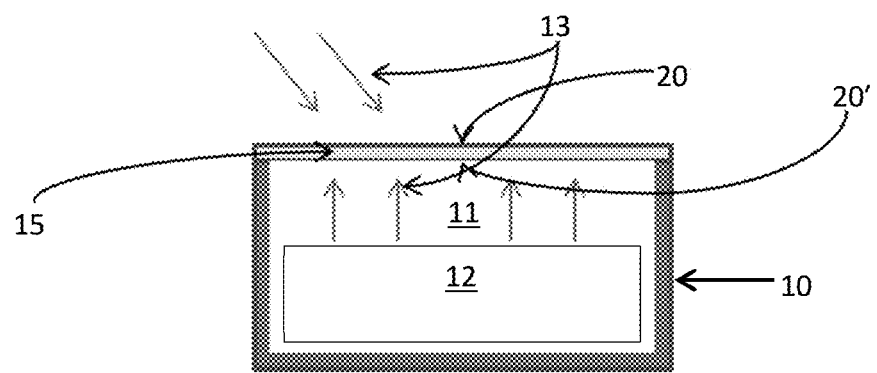
FIG. 2 is a schematic side view of a radome in accordance with alternative embodiments.

With reference to FIGS. 1 and 2, a radome 10 is provided. The radome 10 serves to enclose within a cavity 11 various electrical and non-electrical components 12 of a device, such as an antenna for an aircraft or missile, for example. To this end, the radome 10 may have an aerodynamic shape as shown in FIG. 1, an angular shape as shown in FIG. 2, a spherical shape or any other suitable shape. The radome 10 should also have a low radio frequency impact, a helium leak rate of less than about $5 \times 10^{-9}$ atm-cc/sec, a water vapor transmission rate (WVTR) of less than 26 mg/m$^2$-day, an ability to survive exposure to high temperatures and pressures and an ability to survive extreme physical stress. That is, the radome 10 should be able to impede water vapor transmission with minimal attenuation of electromagnetic signals 13. In particular, the radome 10 should include a substrate 15, a highly conformal coating 20 and possibly a secondary coating 20', each of which will be described in greater detail below.

Figure 3:
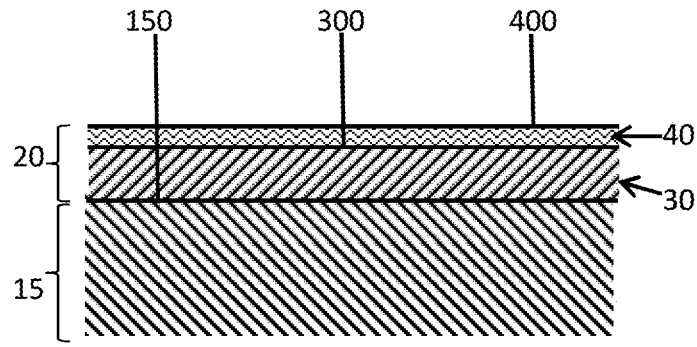
FIG. 3 is an enlarged view of a coating of a radome in accordance with embodiments.
Figure 4:
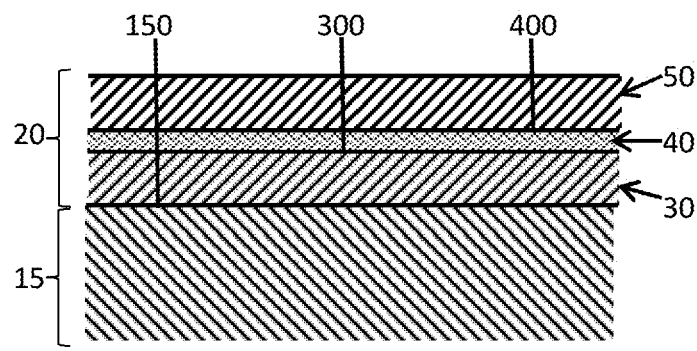
FIG. 4 is an enlarged view of a coating of a radome in accordance with alternative embodiments.
Figure 5:
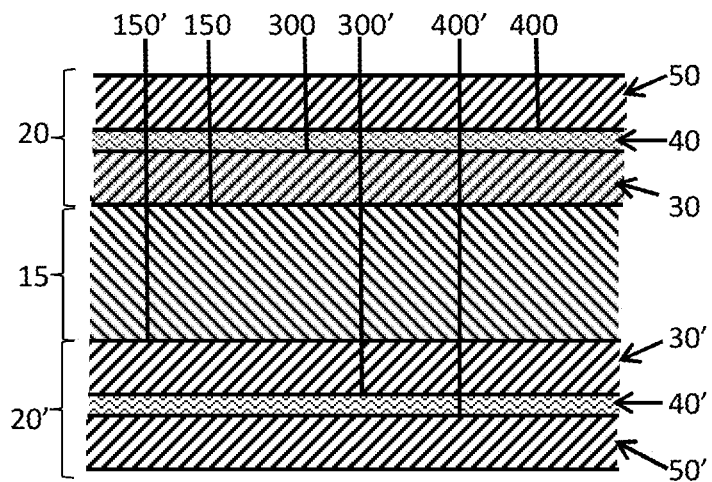
FIG. 5 is an enlarged view of a coating of a radome in accordance with alternative embodiments.

With reference to FIGS. 3-5, the substrate 15 of the radome 10 may be provided as an inorganic, polymeric and/or composite moisture permeable material. Where the substrate 15 is inorganic, the substrate 15 may include, for example, slip cast fused silica (SCFS). Where the substrate 15 is polymeric, the substrate 15 may include, for example, Teflon™ (PTFE), Polyethylene, Polymethelpentene and/or Polystyrene. Where the substrate 15 is a composite, the substrate 14 may include E-Glass/Cyanate-Ester, Quartz/Cyanate Ester, high modulus polyethylene/Cyanate-Ester and/or Quartz/Polybutadiene.

The coating 20 is applied to a surface 150 of the substrate 15 as a highly conformal coating. As shown in FIG. 3, the coating 20 includes a first nano-laminate layer 30 and a second nano-laminate layer 40. As shown in FIG. 4, the coating 20 includes the first nano-laminate layer 30, the second nano-laminate layer 40 and a third nano-laminate layer 50. As shown in FIG. 5, the radome 10 may include the coating 20 substantially as described above with respect to FIG. 4, and the secondary coating 20', which is applied to a surface 150' of the substrate 15. The secondary coating 20' includes a first nano-laminate layer 30', a second nano-laminate layer 40' and a third nano-laminate layer 50', each of which may be different from or substantially similar to their respectively analogous layers in the coating 20.

As shown in FIGS. 3 and 4, the first nano-laminate layer 30 includes organic material disposed on the surface 150 of the substrate 15. The second nano-laminate layer 40 may be formed of a single material or may be a composite. In the latter case, the second nano-laminate layer 40 may include multiple nano-laminate layers of similar or varying composition. In any case, the second nano-laminate layer 40 includes inorganic material disposed on a surface 300 of the first nano-laminate layer 30. The third nano-laminate layer 50 includes organic material disposed on a surface 400 of the second nano-laminate layer 40. As shown in FIG. 5, the first nano-laminate layer 30' includes organic material disposed on the surface 150' of the substrate 15. The second nano-laminate layer 40' may be formed of a single material or may be a composite. In any case, the second nano-laminate layer 40' includes inorganic material disposed on a surface 300' of the first nano-laminate layer 30'. The third nano-laminate layer 50' includes organic material disposed on a surface 400' of the second nano-laminate layer 40'.

In accordance with embodiments, the coating 20 has a WVTR of 5 mg/m$^2$-day, which is well below the performance parameter of the radome 10 listed above.

The first and third nano-laminate layers 30 and 50 may each be about 0.5-1.5 μm thick. The second nano-laminate layer 40 may be about 0.15-0.25 μm thick. In accordance with further embodiments, the first and third nano-laminate layers 30 and 50 may each be about 1.0 μm thick and the second nano-laminate layer 40 may be about 0.2 μm thick. These dimensions and the descriptions below apply to both the coating 20 and the secondary coating 20'.

Although the first and third nano-laminate layers 30 and 50 are described above as being symmetric in terms of their respective thicknesses about the second nano-laminate layer 40, it is to be understood that they symmetry is merely exemplary and that other configurations may be employed. For example, an asymmetric (in terms of the thicknesses of the first and third nano-laminate layers 30 and 50) coating 20 may be used with various low CTE organic or inorganic materials.

The organic material of the first nano-laminate layer 30 may be substantially similar to the organic material of the third nano-laminate layer 50. In accordance with embodiments, the organic material of the first and third nano-laminate layers 30 and 50 may include at least one of Parylene N™ and, more particularly, Parylene Ht™, Parylene F™, Parylene AF-4™, Parylene C™, Parylene D™, fluorinated Parylene, Acrylic and Vapor Deposited Teflon™ (PTFE). The use of Parylene Ht™ for example permits an overall thickness of the coating 20 to be reduced by orders of magnitude. The inorganic material of the second nano-laminate layer 40 may include at least one of alumina, silica, tantalum oxide, zirconium oxide, zinc oxide, beryllium oxide, hafnium oxide, titanium dioxide and silicon dioxide. When used as the organic material of the first nano-laminate layer 30, the Parylene Ht™, for example, serves to smooth the substrate 15 by filling open pores and acts as a mechanical buffer between the substrate 15 and the second nano-laminate layer 40.

Figure 6:
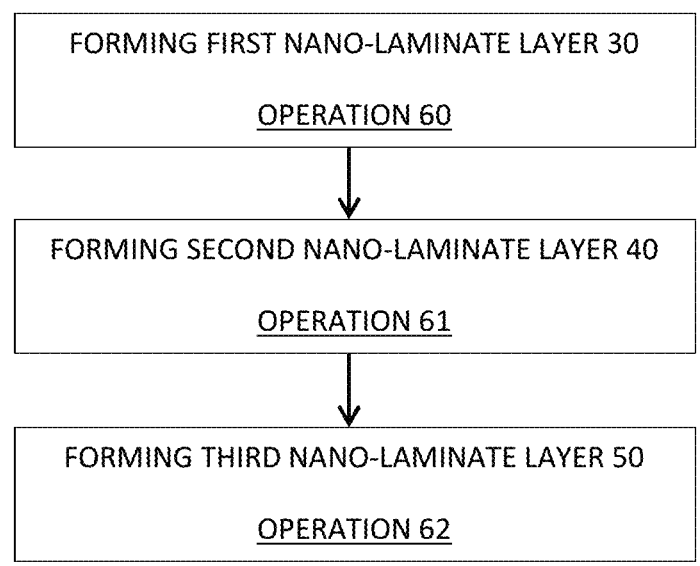
FIG. 6 is a flow diagram illustrating a method of forming the radome coating of FIG. 4 in accordance with embodiments.

With reference to FIG. 6, a method of forming the radome 10 including the SCFS substrate 15 is provided. The method includes forming the first nano-laminate layer 30 including the organic material on the surface 150 of the substrate 15 (operation 60), forming the second nano-laminate layer 40 including the inorganic material on the surface 300 of the first nano-laminate layer 30 (operation 61) and forming the third nano-laminate layer 50 including the organic material disposed on the surface 400 of the second nano-laminate layer 40 (operation 62).

As noted above, the first and third nano-laminate layers 30 and 50 may each be formed to be about 0.5-1.5 μm thick or, more particularly, 1.0 μm thick and the second nano-laminate layer may be formed to be about 0.15-0.25 μm thick or, more particularly, 0.2 μm thick. The organic material of the first nano-laminate layer 30 may be substantially similar to the organic material of the third nano-laminate layer 50 and may include at least one of Parylene N™, Parylene Ht™, Parylene F™, Parylene AF-4™, Parylene C™, Parylene D™, fluorinated Parylene, Acrylic and Vapor Deposited Teflon™ (PTFE). The inorganic material of the second nano-laminate layer 40 may include at least one of alumina, silica, tantalum oxide, zirconium oxide, zinc oxide, beryllium oxide, hafnium oxide, titanium dioxide and silicon dioxide.

In accordance with embodiments, the forming of the first, second and third nano-laminate layers 30, 40 and 50 may include depositing the inorganic material at 100-150° C. above room temperature, cooling the inorganic material and depositing the organic material at room temperature. The depositing of the inorganic material may include conducting an atomic layer deposition (ALD) process and the cooling of the inorganic material may include compression cooling.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagram depicted herein is just one example. There may be many variations to this diagram or the steps (or operations) described therein without departing from the spirit of the disclosure. For instance, the steps may be performed in a differing order or steps may be added, deleted or modified. All of these variations are considered a part of the claimed embodiments.

What is claimed is:
1. A radome, comprising:
a slip cast fused silica (SCFS) substrate formed of moisture permeable material; and
a coating disposed on a surface of the SCFS substrate, the coating being at least 0.65-3.25 microns thick and including a only single layer of inorganic material disposed adjacent to at least one layer of organic material.

2. The radome according to claim 1, wherein the coating has a water vapor transmission rate (WVTR) of 5 mg/m2-day or less.

3. The radome according to claim 1, wherein the coating is formed of inorganic, polymeric and/or composite moisture permeable material.

4. The radome according to claim 1, wherein the layer of inorganic material is sandwiched between layers of organic material.

5. The radome according to claim 4, wherein the layers of organic material are each about 0.5-1.5 microns (μm) thick and the layer of inorganic material is about 0.15-0.25 μm thick.

6. The radome according to claim 1, wherein the organic material comprises at least one of Parylene N™, Parylene Ht™, Parylene F™, Parylene AF-4™, Parylene C™, Parylene D™, fluorinated Parylene, Acrylic and Vapor Deposited Teflon™ (PTFE).

7. The radome according to claim 1, wherein the inorganic material comprises at least one of alumina, silica, tantalum oxide, zirconium oxide, zinc oxide, beryllium oxide, hafnium oxide, titanium dioxide and silicon dioxide.

8. A radome, comprising:
a slip cast fused silica (SCFS) substrate;
a coating and a secondary coating disposed on opposite surfaces of the SFCS substrate, each of the coating and the secondary coating comprising:
a first nano-laminate layer including organic material disposed on each of the opposite surfaces of the SCFS substrate;
a second nano-laminate layer including inorganic material disposed on a surface of the first nano-laminate layer; and
a third nano-laminate layer including organic material disposed on a surface of the second nano-laminate layer.

9. The radome according to claim 8, wherein the first, second and third nano-laminate layers form the coating and the secondary coating to have a water vapor transmission rate (WVTR) of 5 mg/m2-day or less.

10. The radome according to claim 8, wherein, for the coating and the secondary coating, the first and third nano-laminate layers are each about 0.5-1.5 microns (μm) thick and the second nano-laminate layer is about 0.15-0.25 μm thick.

11. The radome according to claim 8, wherein, for the coating and the secondary coating, the organic material of the first nano-laminate layers is substantially similar to the organic material of the third nano-laminate layers.

12. The radome according to claim 11, wherein, for the coating and the secondary coating, the organic material of the first and third nano-laminate layers comprises at least one of Parylene N™, Parylene Ht™, Parylene F™, Parylene AF-4™, Parylene C™, Parylene D™, fluorinated Parylene, Acrylic and Vapor Deposited Teflon™ (PTFE).

13. The radome according to claim 8, wherein, for the coating and the secondary coating, the inorganic material of the second nano-laminate layers comprises at least one of alumina, silica, tantalum oxide, zirconium oxide, zinc oxide, beryllium oxide, hafnium oxide, titanium dioxide and silicon dioxide.

14. A method of forming a radome including a slip cast fused silica (SCFS) substrate, the method comprising:
forming first nano-laminate layers including organic material on opposite surfaces of the SCFS substrate;
forming second nano-laminate layers including inorganic material on respective surfaces of the first nano-laminate layers; and
forming third nano-laminate layers including organic material disposed on respective surfaces of the second nano-laminate layers.

15. The method according to claim 14, wherein the first and third nano-laminate layers are each formed to be about 0.5-1.5 microns (μm) thick and the second nano-laminate layer is formed to be about 0.15-0.25 μm thick.

16. The method according to claim 14, wherein the organic material of the first nano-laminate layers is substantially similar to the organic material of the third nano-laminate layers.

17. The method according to claim 14, wherein the organic material of the first and third nano-laminate layers comprises at least one of Parylene N™, Parylene Ht™, Parylene F™, Parylene AF-4™, Parylene C™, Parylene D™, fluorinated Parylene, Acrylic and Vapor Deposited Teflon™ (PTFE).

18. The method according to claim 14, wherein the inorganic material of the second nano-laminate layers comprises at least one of alumina, silica, tantalum oxide, zirconium oxide, zinc oxide, beryllium oxide, hafnium oxide, titanium dioxide and silicon dioxide.

19. The method according to claim 14, wherein the forming of the first, second and third nano-laminate layers comprises:
depositing the inorganic material at 100-150° C. above room temperature;
cooling the inorganic material; and
depositing the organic material at room temperature.

20. The method according to claim 19, wherein the depositing comprises conducting an atomic layer deposition (ALD) process and the cooling comprises compression cooling.

* * * * *